(12) United States Patent
Vande Lune

(10) Patent No.: US 10,908,127 B2
(45) Date of Patent: Feb. 2, 2021

(54) TESTING APPARATUS AND HANDLES FOR TESTING APPARATUS

(71) Applicant: Illinois Tool Works Inc., Glenview, IL (US)

(72) Inventor: Steven W. Vande Lune, Morrison, IL (US)

(73) Assignee: Illinois Tool Works Inc., Glenview, IL (US)

( * ) Notice: Subject to any disclaimer, the term of this patent is extended or adjusted under 35 U.S.C. 154(b) by 164 days.

(21) Appl. No.: 16/031,522

(22) Filed: Jul. 10, 2018

(65) Prior Publication Data

US 2019/0017969 A1 Jan. 17, 2019

Related U.S. Application Data

(60) Provisional application No. 62/532,893, filed on Jul. 14, 2017.

(51) Int. Cl.
*G01N 29/22* (2006.01)
*G01D 11/24* (2006.01)
(Continued)

(52) U.S. Cl.
CPC ............. *G01N 29/226* (2013.01); *B25F 5/02* (2013.01); *G01D 11/245* (2013.01);
(Continued)

(58) Field of Classification Search
CPC ...... B25F 5/02; G01D 11/245; G01N 29/2412
(Continued)

(56) References Cited

U.S. PATENT DOCUMENTS 5,446,382 A * 8/1995 Flora .................... G01N 27/902
324/232
6,361,194 B1 3/2002 Evans
(Continued)

FOREIGN PATENT DOCUMENTS

CN 210037705 U * 2/2020 ............. G01N 27/84
EP 2813327 12/2014
(Continued)

OTHER PUBLICATIONS

English Abstract of CN210037705 accessed from espacenet.com.*
(Continued)

*Primary Examiner* — Nimeshkumar D Patel
*Assistant Examiner* — Jean F Morello
(74) *Attorney, Agent, or Firm* — McAndrews, Held & Malloy, Ltd

(57) ABSTRACT

Testing apparatus and handles for testing apparatus are disclosed. An example testing apparatus includes: a first housing portion including a first compartment portion and a trigger compartment; a second housing portion including a second compartment portion that is complementary to the first compartment portion, wherein the first compartment portion and the second compartment portion form a yoke compartment when the first housing portion and the second housing portion are attached; a removable seal positioned around a perimeter of at least one of the first compartment portion or the second compartment portion, wherein the removable seal is configured to be compressed between the first housing portion and the second housing portion to seal the yoke compartment; and a trigger cover complementary to the trigger compartment of the first housing portion, wherein the trigger cover and the second housing portion are removably attached to the first housing portion.

20 Claims, 9 Drawing Sheets

(51) Int. Cl.
    *B25F 5/02*     (2006.01)
    *G01N 29/24*    (2006.01)
    *G01N 27/84*    (2006.01)
(52) U.S. Cl.
    CPC ......... *G01N 29/2412* (2013.01); *G01N 27/84* (2013.01); *G01N 2291/26* (2013.01)
(58) Field of Classification Search
    USPC .................................................... 73/855, 431
    See application file for complete search history.

(56)            References Cited

U.S. PATENT DOCUMENTS 7,726,193 B2 *   6/2010   Reiderman ............... B06B 1/04
                                                         73/643
    2014/0371018 A1  12/2014  Ito 2016/0363488 A1*  12/2016  Sipila ................... G01R 33/091
    2017/0059527 A1    3/2017  Lopez
    2019/0285586 A1*   9/2019  Itoi ....................... G01N 27/80
    2019/0376785 A1*  12/2019  Shen ..................... G01B 7/10

FOREIGN PATENT DOCUMENTS

GB         2214641       9/1989
    GB         2328509       2/1999

OTHER PUBLICATIONS

Int'l Search Report and Written Opinion for PCT/US2018/041946 dated Oct. 17, 2018 (14 pgs.).
Int'l Preliminary Report on Patentability for PCT/US2018/041946 dated Jan. 23, 2020 (8 pgs).

* cited by examiner

TESTING APPARATUS AND HANDLES FOR TESTING APPARATUS

RELATED APPLICATIONS

This patent claims priority to U.S. Provisional Patent Application No. 62/532,893, filed Jul. 14, 2017, entitled "Handle for a Testing Apparatus." The entirety of U.S. Provisional Patent Application No. 62/532,893 is incorporated herein by reference.

BACKGROUND

The present disclosure relates generally to handheld tools and, more particularly, to testing apparatus and handles for testing apparatus.

Some nondestructive testing apparatus, such as electromagnetic yokes used for magnetic particle inspection, are exposed to wet environments during typical use. As a result, such nondestructive testing apparatus and/or electrical components of the nondestructive testing apparatus may come into contact with fluids electrical components of the testing apparatus. Conventional wet environment testing apparatus are typically constructed with heavy, poured elastomer housings. As can be readily appreciated, such testing apparatus are difficult to maneuver due to weight and service due to solid molding, and can result in operator fatigue over the course of extended use.

SUMMARY

Testing apparatus and handles for testing apparatus are disclosed, substantially as illustrated by and described in connection with at least one of the figures, as set forth more completely in the claims.

BRIEF DESCRIPTION OF THE DRAWINGS

These and/or other aspects will become apparent and more readily appreciated from the following description of the exemplary embodiments, taken in conjunction with the accompanying drawings.

The figures are not necessarily to scale. Where appropriate, similar or identical reference numbers are used to refer to similar or identical components.

DETAILED DESCRIPTION

Figure 1:
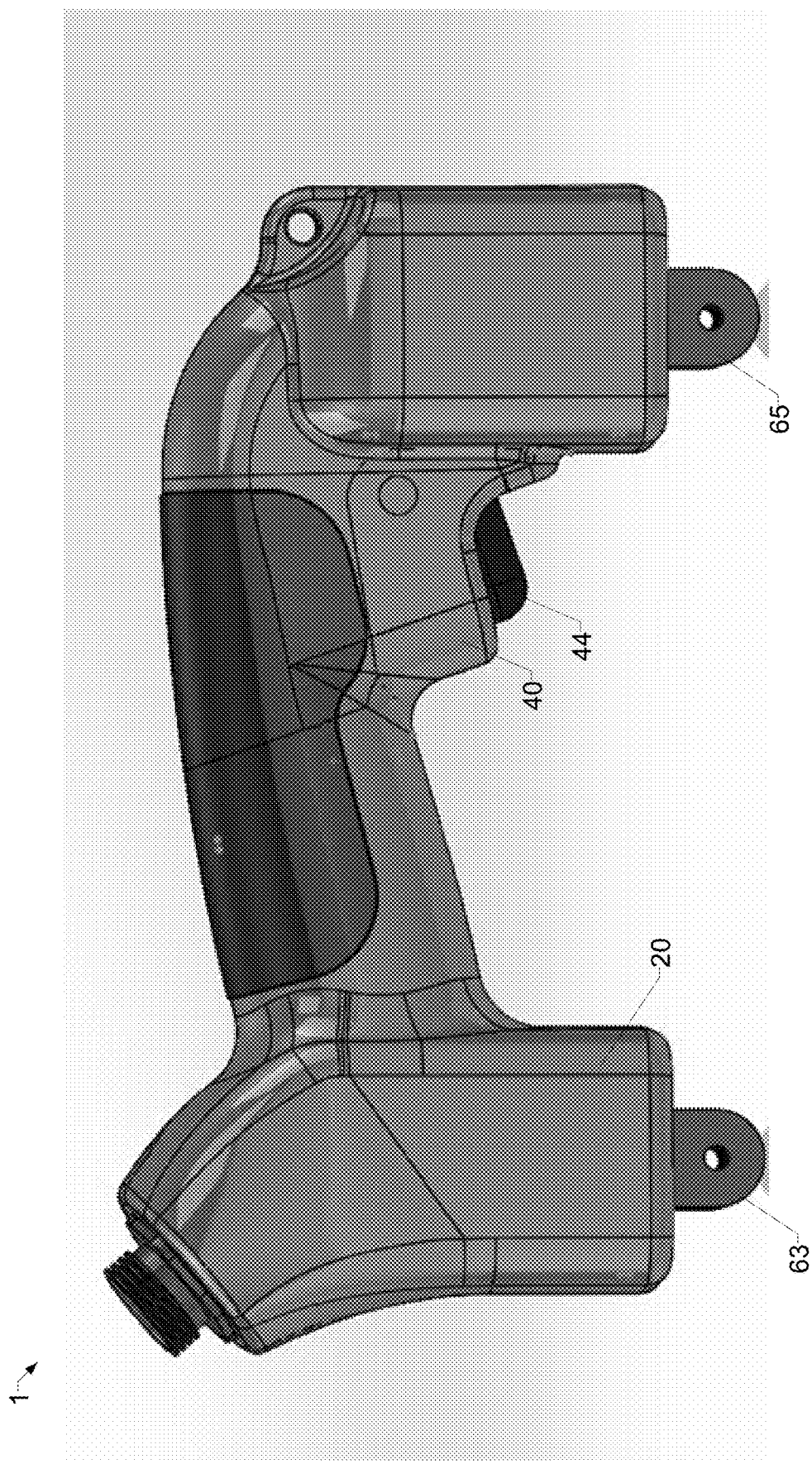
FIG. 1 is a perspective view of a testing apparatus, in accordance with aspects of the present disclosure.

Disclosed example testing apparatus include: a first housing portion including a first compartment portion and a trigger compartment; a second housing portion including a second compartment portion that is complementary to the first compartment portion, wherein the first compartment portion and the second compartment portion form a yoke compartment when the first housing portion and the second housing portion are attached; a removable seal positioned around a perimeter of at least one of the first compartment portion or the second compartment portion, wherein the removable seal is configured to be compressed between the first housing portion and the second housing portion to seal the yoke compartment; and a trigger cover complementary to the trigger compartment of the first housing portion, wherein the trigger cover and the second housing portion are removably attached to the first housing portion.

In some example testing apparatus, the trigger cover is removable from the first housing portion without removing the second housing portion from the first housing portion. Some examples further include an electrical switch, a spring, and an actuator positioned within the trigger compartment, in which the trigger cover and the trigger compartment are configured to enclose the electrical switch, the spring, and the actuator when attached. In some examples, the spring is a torsional spring that is rotatably loaded by the actuator around an axle. In some examples, the electrical switch is a sealed electrical switch that is replaceable by removing the trigger cover.

In some example testing apparatus, the removable seal is compressed between the first housing portion and the second housing portion when the trigger cover is removed. In some examples, the removable seal provides ingress protection to the yoke compartment. In some examples, the second housing portion and the trigger cover are removably attached the first housing portion by a plurality of fasteners. In some examples, at least one of the first housing portion, the second housing portion, or the trigger cover is injection molded.

In some examples, the first housing portion includes a first leg aperture and a second leg aperture. Some example testing apparatus further include: a first electromagnetic coil disposed within the yoke compartment; a second electromagnetic coil disposed within the yoke compartment; and a core extending through the first leg aperture, the first electromagnetic coil, the yoke compartment, the second electromagnetic coil, and the second leg aperture. In some examples, the core is sealed in the first leg aperture by a resin and the core is sealed in the second leg aperture by the resin. Some examples further include a first leg seal configured to seal the first leg aperture and a second leg seal configured to seal the second leg aperture. In some examples the first leg seal comprises a conforming material configured to seal against the core and at least one of the first housing portion or the second housing portion for a range of thicknesses of the core.

In some example testing apparatus, the first housing portion includes a channel configured to receive the removable seal around the perimeter of the first compartment portion. Some example testing apparatus further include: a wire aperture in the channel of the first housing portion, the removable seal configured to span the wire aperture; and a plurality of wires configured to traverse the wire aperture between the yoke compartment and the trigger compartment. In some examples, the plurality of wires is sealed in the wire aperture by at least one of a resin or a potting compound. In some examples, a waterproof connector is applied over the plurality of wires and a plurality of leads of an electrical switch in the trigger compartment. In some examples, the plurality of wires includes at least one subsection of extra length.

In some example testing apparatus, the first housing portion includes an electrical power plug aperture, the testing apparatus comprising a removable plug configured to conduct electrical power current between the removable plug and one or more components in the yoke compartment, the removable plug configured to seal against the power plug aperture.

FIG. 1 illustrates an example testing apparatus 1, which in the example of FIG. 1 is an electromagnetic yoke used for magnetic particle inspection. The testing apparatus 1 includes a first housing portion 10, a second housing portion 20, and a trigger cover 40. The first housing portion 10 and the second housing portion 20, when joined or attached, form a yoke compartment 17 that contains the electromagnetic components of the example testing apparatus 1. The second housing portion 20 and the trigger cover 40 are separately removably attached to the first housing portion 10 by a plurality of screws 50, rivets, and/or any other type of fastener.

The testing apparatus 1 is often used in a wet environment. A magnetic particle solution is poured or applied to an item undergoing testing. Then, the electromagnetic yoke is used to apply a magnetic field the item undergoing testing. A user presses a trigger or actuator 44 on the testing apparatus 1 to activate at least one electromagnetic (EM) coil 62, 64 (illustrated in FIG. 2). A core 66 extends through the first electromagnetic coil 62, the yoke compartment 17, and the second electromagnetic coil 64. The core 66 terminates at a first leg 63 and a second leg 65 extend from the testing apparatus 1 to contact the item undergoing testing. The example core 66 is constructed using multiple laminations of a ferromagnetic material.

Figure 2:
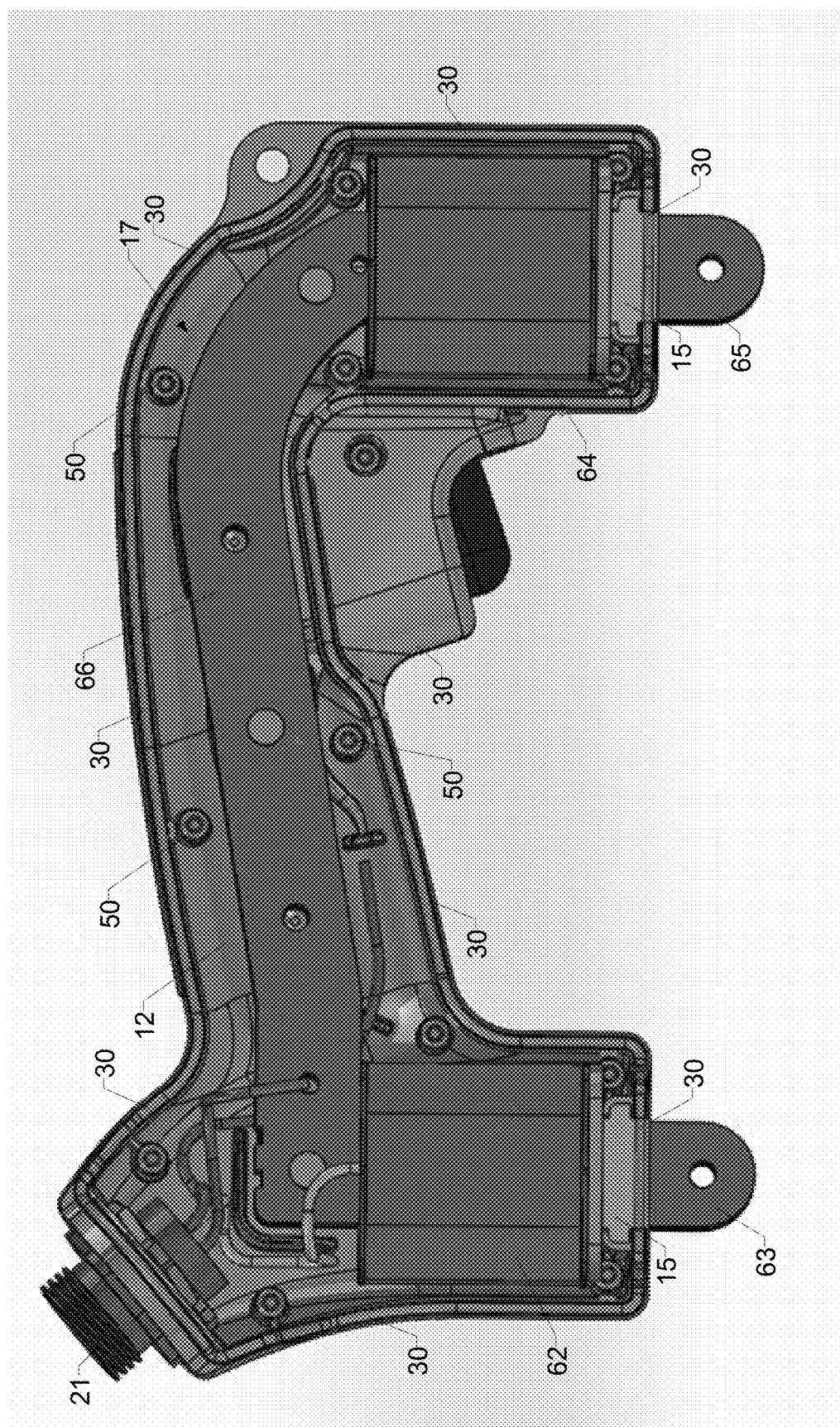
FIG. 2 is a side view of an interior of a portion of the example testing apparatus of FIG. 1.

FIG. 2 illustrates an interior of the testing apparatus 1. A first housing portion 10 includes a first compartment portion 12, in which a first electromagnetic coil 62 and a second electromagnetic coil 64 are disposed. Wires and contact bars connect the coils 62, 64 to a power source (input through a power plug aperture 19). A removable plug 21 is detachably connected to the power plug aperture 19, and seals the power plug aperture 19 against intrusion by moisture or other foreign particles. The example removable plug 21 may be connected to a power source and transmits the electrical power to the coils 62, 64 via wiring within the yoke compartment 17.

The core 66 extends from the first EM coil 62 through a first leg aperture 16 and terminates at a first leg 63. Similarly, the core extends from the second EM coil 64 through a second leg aperture 18 and terminates at a second leg 65. In some examples, the core 66 and/or the first leg 63 are sealed in the first leg aperture 16 by a resin 15 and the second leg 65 and/or the core 66 are sealed in the second leg aperture 18 by the resin 15. Additionally or alternatively, the first leg 63, the second leg 65, and/or the core 66 are sealed in the first leg aperture 16 and/or the second leg aperture 18 by a conforming material configured to seal against the core 66 and/or the first leg 63 or the second leg 65, and against the first housing portion 10 and/or the second housing portion 20. The resin 15 or conforming material enables the apertures 16, 18 to be sealed despite potential variations in the thicknesses of the laminations used to construct the core 66.

A second housing portion 20 (illustrated in FIG. 3C) is connected to first housing portion 10. Between the housing portions 10, 20 is positioned a removable seal 30. The seal 30 provides ingress protection (against, for example, but not limited to, water and particulate). In the illustrated example, the seal 30 is placed within a channel 13 of the first housing portion 10. The seal 30 joins together the housing portions 10, 20 and provides ingress protection due to compression of the seal 30. The removable seal 30 may be, for example, but not limited to, a gasket or an O-ring. As illustrated in FIG. 2, the removable seal 30 is positioned around a perimeter of the first compartment portion and excludes the trigger compartment 14 (covered by trigger cover 40 in FIG. 2). The seal 30 traverses the first leg aperture 16 and the second leg aperture 18.

Figure 3A:
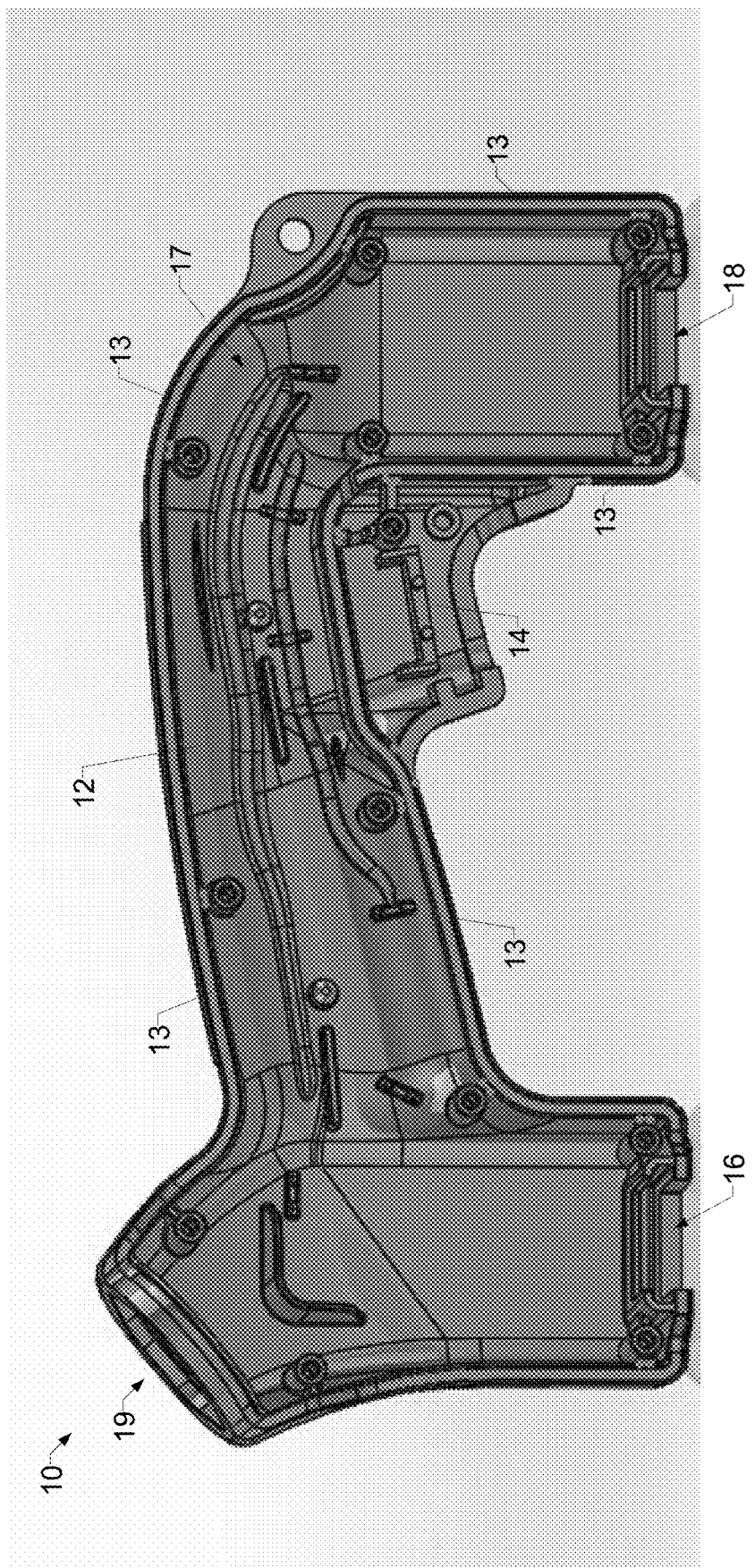
FIG. 3A is a side view of a first housing portion of the example testing apparatus of FIG. 1.

FIG. 3A illustrates the first housing portion 10 which includes the first compartment portion 12 and a trigger compartment 14. The perimeter/channels 13 (on which the removable seal 30 is placed) surrounds the first compartment portion 12 and excludes the trigger compartment 14. Thus, the removable seal 30 provides ingress protection for the EM coils and associated electrical components. The first housing portion 10 receives the second housing portion 20 to complete the yoke compartment 17 between the first compartment portion 12 and a second compartment portion 22 (illustrated in FIG. 3C). Additionally, the first housing portion 10 receives the trigger cover 40 (illustrated in FIG. 3B).

Figure 3B:
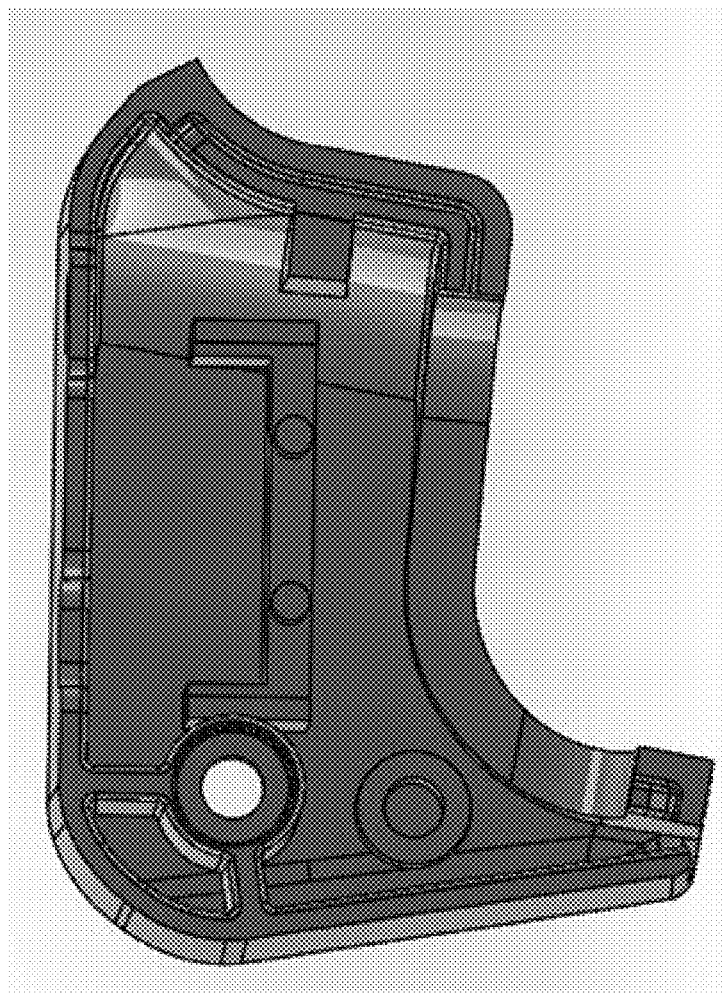
FIG. 3B is a side view of a trigger cover of the example testing apparatus of FIG. 1.
Figure 5:
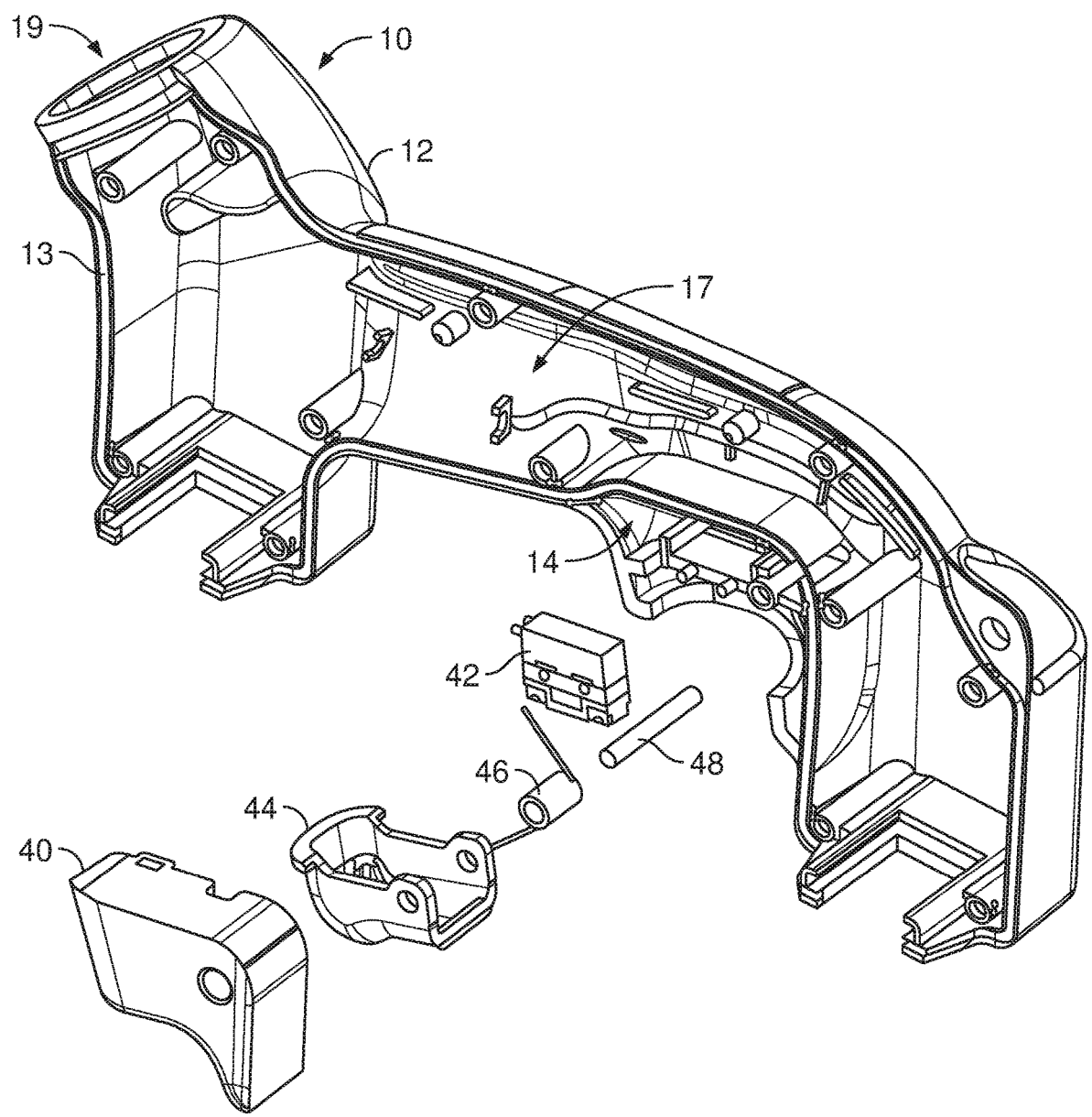
FIG. 5 is an exploded view of the trigger cover and first housing portion of the example testing apparatus of FIG. 1.

FIG. 3B illustrates the trigger cover 40 of the testing apparatus 1. The trigger cover 40 is injection molded from a plastic. In some embodiments, the first housing portion 10 and the second housing portion 20 are similarly injection molded. The trigger cover 40 shape is complementary to the trigger compartment 14 of the first housing portion 10. The trigger cover 40 receives at least one screw to removably attach to the first housing portion. FIG. 5 illustrates an exploded view of the trigger cover 40 and first housing portion 10. Between the cover 40 and first housing portion 10 are positioned an electrical switch 42, an actuator 44, a spring 46, and an axle 48. In some examples, the electrical switch 42 is a sealed electrical switch to provide ingress protection. Example implementations of the electrical switch 42 include sealed, snap-action basic switches, including single-pole single-throw, single-pole double-throw, and/or any other types of switches.

Figure 6A:
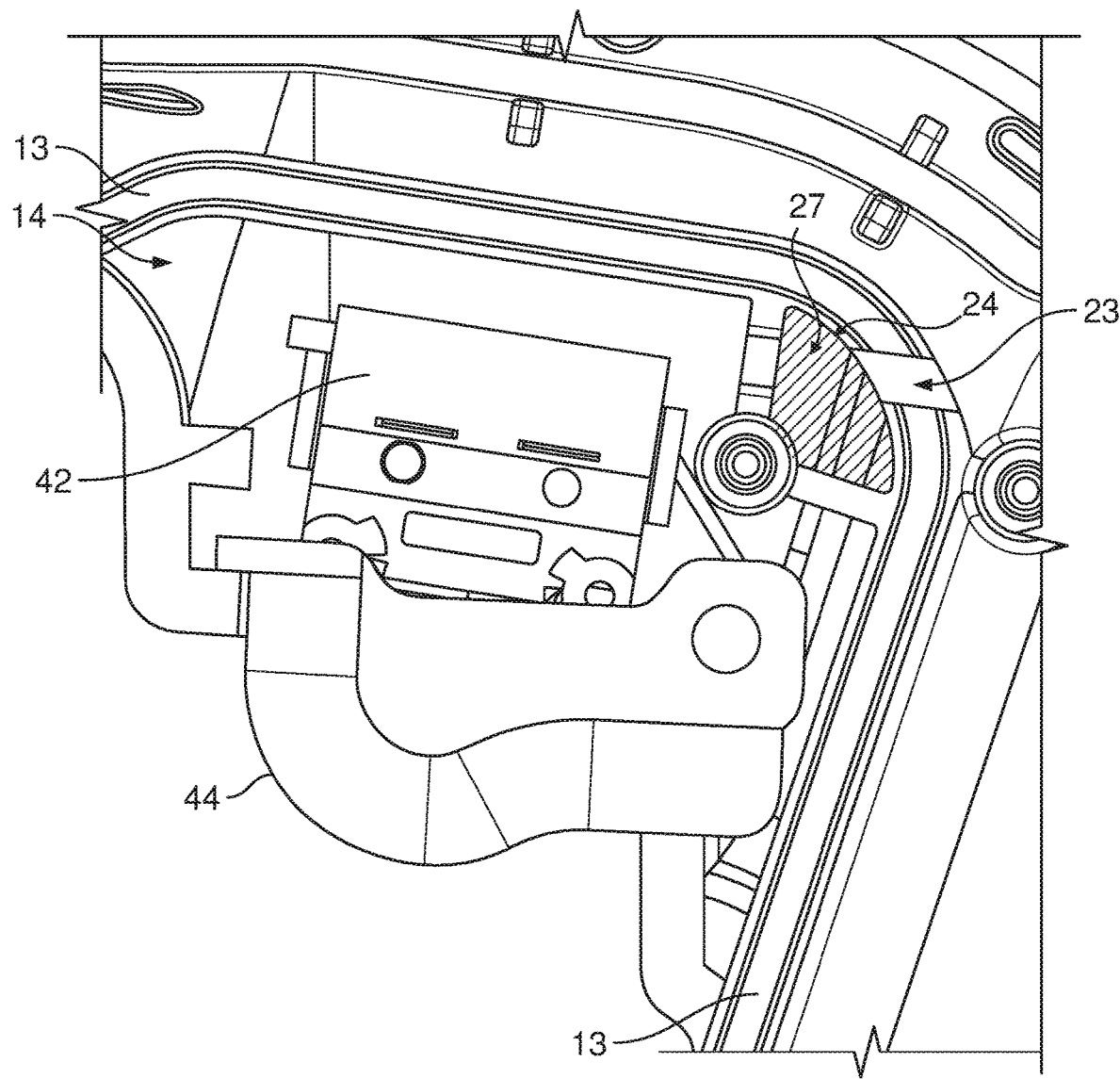
FIGS. 6A and 6B are detailed views of a trigger compartment of the example testing apparatus of FIG. 1.

The example spring 46 is a torsional spring. A torsional spring 46 rotating around the axle 48 has a small footprint, thus allowing smaller dimensions for the trigger compartment 14 and the trigger cover 40. A user of the testing apparatus presses the actuator 44 to twists the spring 46 about the axle 48 and actuate the electrical switch 42. Thus, the EM coils 62, 64 are energized and the legs 63, 65 and apply a magnetic field to an item undergoing testing. FIG. 6A illustrates a detailed view of the components 42, 44, 46, and 48 inside the trigger compartment 14 with the trigger cover 40 removed.

Figure 3C:
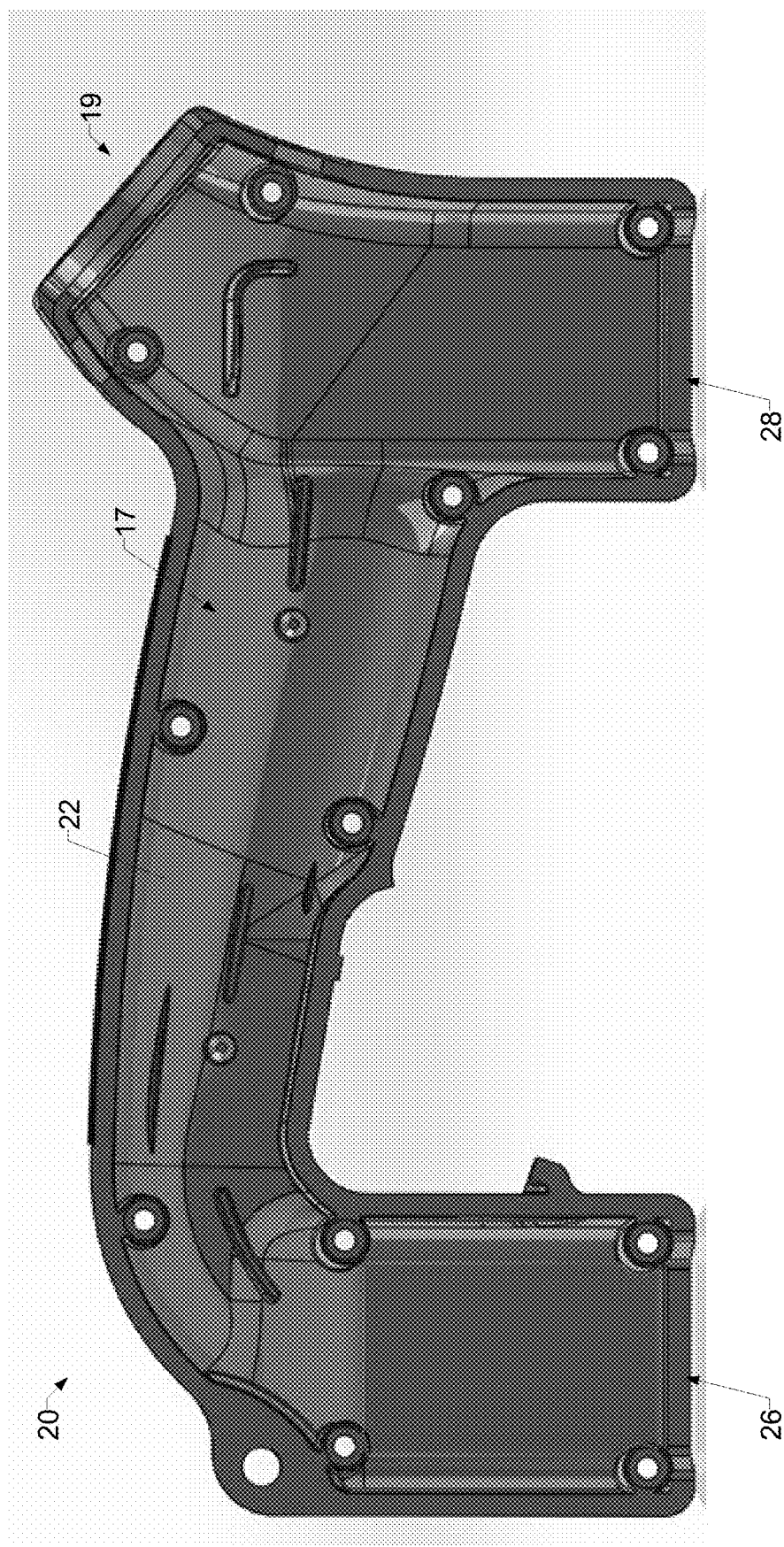
FIG. 3C is a side view of a second housing portion of the example testing apparatus of FIG. 1.

FIG. 3C illustrates the second housing portion 20 of the testing apparatus 1 of the present disclosure. The second housing portion 20 includes a second compartment portion 22 which is complementary to the first compartment half 12 of the first housing portion 10. A first leg aperture 26 and second leg aperture 28 are complementary to the associated apertures 16, 28 of the first housing portion 10. As described above, the compartment portions 12, 22 create a yoke compartment 17. Contents of the yoke compartment 17 (EM coils 62, 64, the core 66, and associated electrical components and/or wiring) are protected from ingress of water and particulate by the removable seal 30. The seal 30 is compressed by the housing portions 10, 20.

While the first housing portion 10 includes a trigger compartment 14, the second housing portion 20 only includes the second compartment portion 22. In some examples, the second housing portion 20 includes a channel similar to the channel 13 of the first housing portion 10 to receive the removable seal 30 around the perimeter of the second compartment portion 22. In some examples, the housing portions 10, 20 are removably attached by a plurality of screws 50. When the housing portions 10, 20 are re-attached after removal, a resin 15 may be reapplied to the first leg aperture 26 and the second leg aperture 28.

Figure 4:
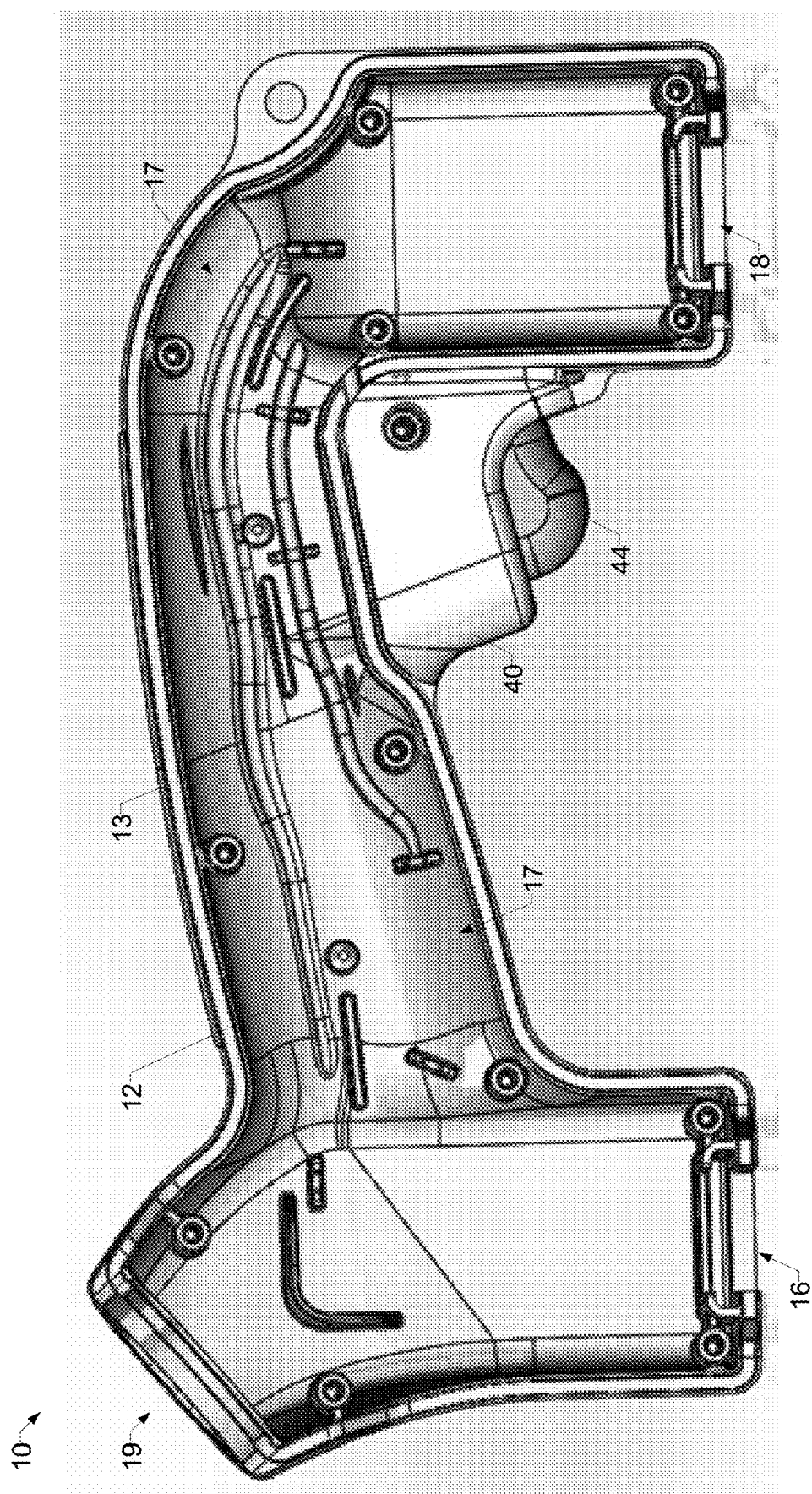
FIG. 4 is a side view of the trigger cover attached to the first housing portion of the example testing apparatus of FIG. 1.

FIG. 4 illustrates the trigger cover 40 removably attached to the first housing portion 10 of the testing apparatus 1 without the second housing portion 20 attached. This figure is provided to illustrate that the second housing portion 20 and the trigger cover 40 are separately removable from the first housing portion 10. In use, the trigger cover 40 is removed more often than the second housing portion 20 for service of the electrical switch 42, actuator 44, spring 46, and/or the axle 48.

Since the trigger compartment 14 and trigger cover 40 are excluded from the area surrounded and protected by the removable seal 30, the yoke compartment (formed by compartment portions 12, 22) is not disturbed by removal of the trigger cover 40. Thus, the testing apparatus 1 of the present disclosure is lighter because the housing portions 10, 20 are injection molded (instead of pour molded) while still providing ingress protection at least in part because of the removable seal 30. Furthermore, the separate trigger compartment 14 on the first housing portion 10 outside of the removable seal 30 and separately covered by the trigger cover 40 is easily accessible without removing the second housing portion 20. A user or repairman of the testing apparatus 1 of the testing apparatus is able to replace trigger components 42, 44, 46, or 48 underneath the trigger cover 40 without breaking the handle (as in conventional testing apparatus handles) or reapplying a resin 15 to apertures 16, 18, 26, 28.

Figure 6B:
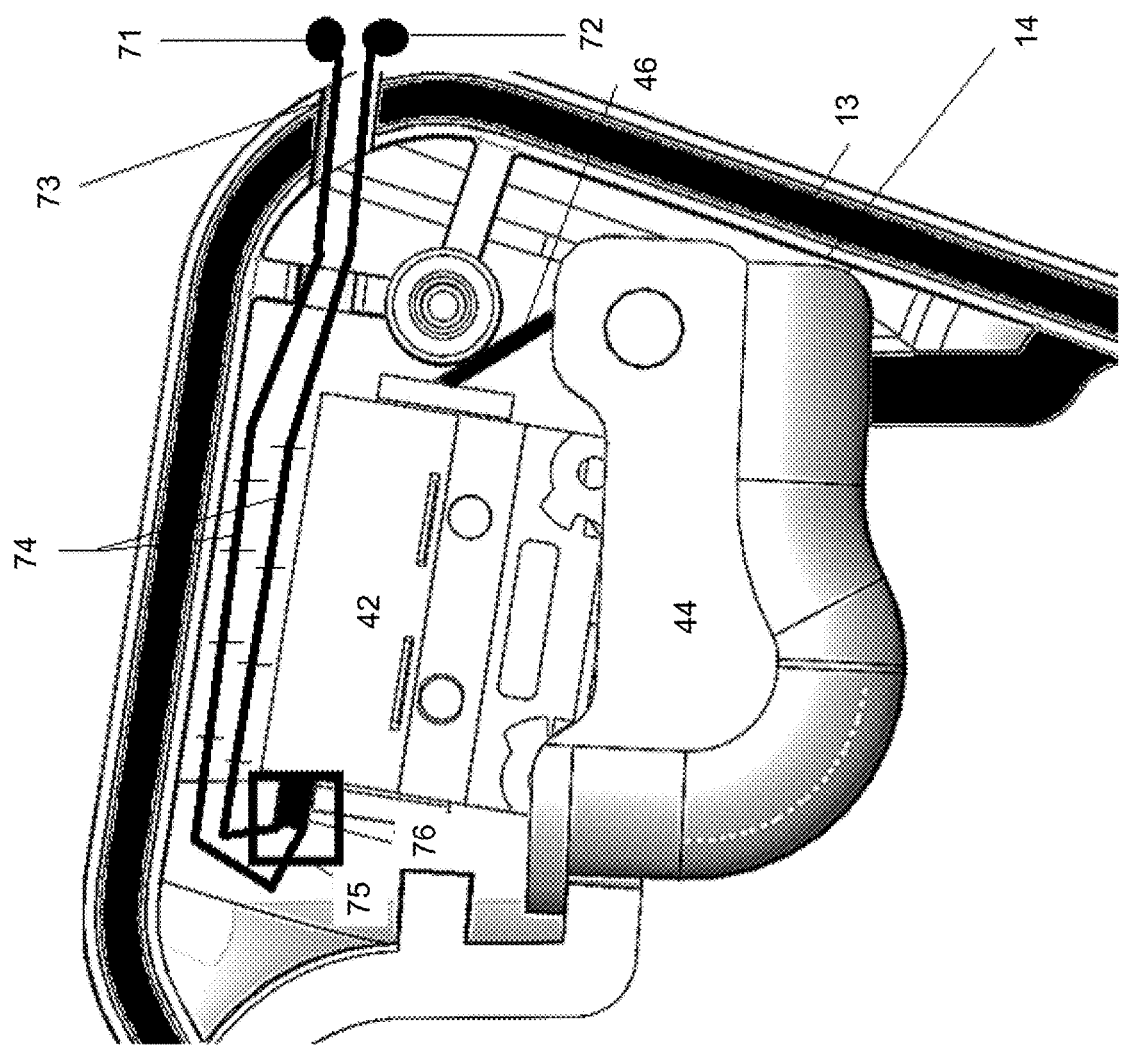

FIG. 6B illustrates a detailed view of the trigger compartment 14 of the first housing portion 10. The spring 46 is loaded and unloaded by a user pressing on the actuator 44. In one embodiment, the spring 46 is a torsional spring. The torsional spring 46 rotates about the axle 48 (behind actuator 44; visible in FIG. 4). The torsional spring 46, axle 48, and actuator 44 have a small footprint—taking up minimal surface area in the trigger compartment 14 and having a minimal height into the trigger cover 40. Thus, a smaller trigger compartment 14 and trigger cover 40 can be used in the testing apparatus 1. A variety of spring 46 dimensions and physical characteristics are possible.

When the user presses the actuator 44 down sufficiently, the electrical switch 42 is actuated. Then the EM coils 62, 64 are energized and the legs 63, 65 and apply a magnetic field to an item undergoing testing. In one embodiment, the electrical switch 42 is a sealed electrical switch with ingress protection against water and particulate. The sealed electrical switch 42 has a plurality of leads 76 (leads may also be referred to as, for example, but not limited to, contacts).

A plurality of wires 71, 72 connect to the switch 42 at the plurality of leads 76. The plurality of wires 71, 72 transmit a trigger signal from the switch 42 to another component inside the testing apparatus 1 (for example, but not limited to, a processor).

In the example of FIG. 6B, the plurality of wires 71, 72 pass from the trigger compartment 14 to the first compartment portion 12. As illustrated in FIG. 6A, the first housing portion 10 includes a first wire aperture 23 in the channel 13, a potting chamber 24, and a second wire aperture 25 between the potting chamber 24 and the trigger compartment 14. The removable seal 30 traverses the wire aperture 23. The first wire aperture 23, the potting chamber 24, and the second wire aperture 25 enable wires from the electrical switch 42 to be routed into the yoke compartment 17, while protecting against ingress by fluid that may penetrate into the trigger compartment 14. For example, after routing of the wires 71, 72 through the first wire aperture 23, the potting chamber 24, and the second wire aperture 25 into the yoke compartment 17, the remainder of the first wire aperture 23, the potting chamber 24, and the second wire aperture 25 may be filled with a potting material 27, resin, or other sealing material to prevent ingress of fluid into the yoke compartment 17, including while the trigger cover 40 is removed. The components 42, 44, 46, 48 and wires/contacts 71, 73, 76 are accessible for service by removing the trigger cover 40 off the trigger compartment 14 of the first housing portion 10 without removing the second housing portion 20.

In other examples, a waterproof connector 75 is applied around the plurality of wires 71, 72 and the leads 76 of the electrical switch 42. The waterproof connector 75 is, for example, but not limited to, a heat shrink crimp connector. The waterproof connector provides ingress protection to the wires 71, 72 and leads 76 of the electrical switch 42. Thus, contents of the trigger compartment 14 are protected from water and particulate despite the trigger compartment being excluded from the removable seal 30 around the perimeter of the first compartment portion 12.

In some examples, the plurality of wires 71, 72 include several subsections 74 of extra length. The subsections 74 provide additional wire for cutting when servicing the electrical switch 42. A user may for example, but not limited to, replace the electrical switch 42 requiring the wires 71, 73 to be cut. With the subsections 74 of extra length, the user can cut wire 71, 73 and have remaining length to connect to the new electrical switch 42 without removing the second housing portion 20 from the first housing portion 10 and/or running new wire from the yoke compartment 17 to the trigger compartment 14 through the wire aperture 73 and possibly compromising the ingress protection of the removable seal 30 and channels 13. In one embodiment, the plurality of wires 71, 73 inside the trigger compartment are greater than 2 inches long (i.e., the extra subsections 74 of length are 3 inches; or there are four subsections 74 each ½ inch long on each of the plurality of wires 71, 72). In another embodiment, the plurality of wires 71, 73 inside the trigger compartment are greater than 4 inches long.

Thus, disclosed example testing apparatus and handles for testing apparatus include a first housing portion 10, a second housing portion 20, a removable seal 30, and a trigger cover 40. The trigger cover 40 and the second housing portion 20 are removably attached to the first housing portion 10. The first housing portion 10 includes a first compartment portion 12 and a trigger compartment 14. The second housing portion 20 includes a second compartment portion 22 complementary to the first compartment portion 12. The removable seal 30 is compressed between the first housing portion 10 and the second housing portion 20 and is positioned around the first compartment portion 12 and excluding the trigger compartment 14. The trigger cover 40 is complementary to the trigger compartment 14 of the first housing portion.

The disclosed example testing apparatus and handles for testing apparatus provides, among other things, the benefits of: a lighter and more ergonomic testing apparatus 1 for use during magnetic particle inspection. The separate trigger cover 40 allows better access for servicing the electrical switch 42 without adversely affecting the seal 30 around the yoke compartment 17. Thus, ingress protection (from water, dust, etc.) is not changed during removal of the trigger cover 40.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The above-cited patents and patent publications are hereby incorporated by reference in their entirety. While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A testing apparatus, comprising:
   a first housing portion including a first compartment portion and a trigger compartment;
   a second housing portion including a second compartment portion that is complementary to the first compartment portion, wherein the first compartment portion and the second compartment portion form a yoke compartment when the first housing portion and the second housing portion are attached;
   a removable seal positioned around a perimeter of at least one of the first compartment portion or the second compartment portion, wherein the removable seal is configured to be compressed between the first housing portion and the second housing portion to seal the yoke compartment, wherein the trigger compartment is external to the yoke compartment; and
   a trigger cover complementary to the trigger compartment of the first housing portion, wherein the trigger cover and the second housing portion are removably attached to the first housing portion.

2. The testing apparatus of claim 1, wherein the trigger cover is removable from the first housing portion without removing the second housing portion from the first housing portion.

3. The testing apparatus of claim 1, further comprising an electrical switch, a spring, and an actuator positioned within the trigger compartment, the trigger cover and the trigger compartment configured to enclose the electrical switch, the spring, and the actuator when attached.

4. The testing apparatus of claim 3, wherein the spring is a torsional spring that is rotatably loaded by the actuator around an axle.

5. The testing apparatus of claim 3, wherein the electrical switch is a sealed electrical switch that is replaceable by removing the trigger cover.

6. The testing apparatus of claim 1, wherein the removable seal is compressed between the first housing portion and the second housing portion when the trigger cover is removed.

7. The testing apparatus of claim 6, wherein the removable seal provides ingress protection to the yoke compartment.

8. The testing apparatus of claim 1, wherein the second housing portion and the trigger cover are removably attached the first housing portion by a plurality of fasteners.

9. The testing apparatus of claim 1, wherein at least one of the first housing portion, the second housing portion, or the trigger cover is injection molded.

10. The testing apparatus of claim 1, wherein the first housing portion comprises a first leg aperture and a second leg aperture.

11. A testing apparatus comprising:
    a first housing portion including a first compartment portion, a trigger compartment, a first leg aperture, and a second leg aperture;
    a second housing portion including a second compartment portion that is complementary to the first compartment portion, wherein the first compartment portion and the second compartment portion form a yoke compartment when the first housing portion and the second housing portion are attached;
    a removable seal positioned around a perimeter of at least one of the first compartment portion or the second compartment portion, wherein the removable seal is configured to be compressed between the first housing portion and the second housing portion to seal the yoke compartment;
    a trigger cover complementary to the trigger compartment of the first housing portion, wherein the trigger cover and the second housing portion are removably attached to the first housing portion;
    a first electromagnetic coil disposed within the yoke compartment;
    a second electromagnetic coil disposed within the yoke compartment; and
    a core extending through the first leg aperture, the first electromagnetic coil, the yoke compartment, the second electromagnetic coil, and the second leg aperture.

12. The testing apparatus of claim 11, wherein the core is sealed in the first leg aperture by a resin and the core is sealed in the second leg aperture by the resin.

13. The testing apparatus of claim 11, further comprising a first leg seal configured to seal the first leg aperture and a second leg seal configured to seal the second leg aperture.

14. The testing apparatus of claim 13, wherein the first leg seal comprises a conforming material configured to seal against the core and at least one of the first housing portion or the second housing portion for a range of thicknesses of the core.

15. The testing apparatus of claim 1, wherein the first housing portion comprises a channel configured to receive the removable seal around the perimeter of the first compartment portion.

16. A testing apparatus comprising:
    a first housing portion including a first compartment portion and a trigger compartment;
    a second housing portion including a second compartment portion that is complementary to the first compartment portion, wherein the first compartment portion and the second compartment portion form a yoke compartment when the first housing portion and the second housing portion are attached;
    a removable seal positioned around a perimeter of at least one of the first compartment portion or the second compartment portion, wherein the removable seal is configured to be compressed between the first housing portion and the second housing portion to seal the yoke compartment, wherein the first housing portion comprises a channel configured to receive the removable seal around the perimeter of the first compartment portion;
    a trigger cover complementary to the trigger compartment of the first housing portion, wherein the trigger cover and the second housing portion are removably attached to the first housing portion;
    a wire aperture in the channel of the first housing portion, the removable seal configured to span the wire aperture; and
    a plurality of wires configured to traverse the wire aperture between the yoke compartment and the trigger compartment.

17. The testing apparatus of claim 16, wherein the plurality of wires is sealed in the wire aperture by at least one of a resin or a potting compound.

18. The testing apparatus of claim 16, wherein a waterproof connector is applied over the plurality of wires and a plurality of leads of an electrical switch in the trigger compartment.

19. The testing apparatus of claim 16, wherein the plurality of wires includes at least one subsection of extra length.

20. The testing apparatus of claim 1, wherein the first housing portion comprises an electrical power plug aperture, the testing apparatus comprising a removable plug configured to conduct electrical power current between the removable plug and one or more components in the yoke compartment, the removable plug configured to seal against the electrical power plug aperture.

* * * * *